(12) United States Patent
Eick et al.

(10) Patent No.: US 8,897,094 B2
(45) Date of Patent: Nov. 25, 2014

(54) MARINE SEISMIC DATA ACQUISITION USING DESIGNED NON-UNIFORM STREAMER SPACING

(75) Inventors: Peter M. Eick, Houston, TX (US); Joel D. Brewer, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 730 days.

(21) Appl. No.: 13/156,132

(22) Filed: Jun. 8, 2011

(65) Prior Publication Data

US 2011/0305106 A1  Dec. 15, 2011

Related U.S. Application Data

(60) Provisional application No. 61/353,089, filed on Jun. 9, 2010, provisional application No. 61/353,095, filed on Jun. 9, 2010.

(51) Int. Cl.
*G01V 1/38* (2006.01)

(52) U.S. Cl.
CPC .................................. *G01V 1/3826* (2013.01)
USPC ........................................................ 367/17

(58) Field of Classification Search
USPC ............ 367/20, 14–17, 37–38, 56–58; 181/5, 181/112, 122
See application file for complete search history.

(56) References Cited

U.S. PATENT DOCUMENTS

| 3,747,055 | A | 7/1973 | Greene, Jr. |
| 4,509,151 | A | 4/1985 | Anderson |
| 4,559,605 | A | 12/1985 | Norsworthy |
| 4,967,400 | A | 10/1990 | Woods |
| 4,992,990 | A * | 2/1991 | Langeland et al. ............. 367/19 |
| 5,168,472 | A | 12/1992 | Lockwood |
| 5,774,417 | A * | 6/1998 | Corrigan et al. ................ 367/24 |
| 5,835,450 | A * | 11/1998 | Russell ........................... 367/20 |
| 6,009,042 | A | 12/1999 | Workman et al. |
| 6,493,636 | B1 * | 12/2002 | DeKok ............................ 702/17 |
| 7,234,407 | B1 | 6/2007 | Levine et al. |
| 7,359,283 | B2 | 4/2008 | Vaage et al. |
| 7,451,717 | B1 | 11/2008 | Levine et al. |
| 7,499,374 | B2 | 3/2009 | Ferber |
| 7,499,737 | B2 * | 3/2009 | Mizuta et al. .............. 455/575.3 |

(Continued)

FOREIGN PATENT DOCUMENTS

WO    2008073178    6/2008

OTHER PUBLICATIONS

Martin, et al., "Acquisition of marine point receiver seismic data with a towed streamer.," SEG 2000 Expanded Abstracts, (2000).

(Continued)

*Primary Examiner* — Isam Alsomiri
*Assistant Examiner* — Amienatta M Ndure Jobe
(74) *Attorney, Agent, or Firm* — ConocoPhillips Company

(57) ABSTRACT

The invention relates to an arrangement for seismic streamers used in the acquisition of seismic data in a marine environment where the spacing between each adjacent pair of streamers is not all the same. Some streamer spacings and/or receiver spacings are larger and some are smaller to provide a higher quality wavefield reconstruction when covering a larger total area or for a similar total area of seismic data acquisition while providing a wavefield that is optimally sampled by the receivers so that the wavefield reconstruction is suitable for subsurface imaging needs.

5 Claims, 8 Drawing Sheets

(56) References Cited

U.S. PATENT DOCUMENTS

| | | |
|---|---|---|
| 7,545,703 B2 | 6/2009 | Lunde et al. |
| 7,646,671 B2 * | 1/2010 | Pan et al. .................. 367/21 |
| 7,993,164 B2 * | 8/2011 | Chatterjee et al. ............ 439/628 |
| 2007/0013546 A1 | 1/2007 | McConnell et al. |
| 2007/0025182 A1 * | 2/2007 | Robertsson ................. 367/18 |
| 2008/0008037 A1 | 1/2008 | Welker |
| 2008/0049551 A1 * | 2/2008 | Muyzert et al. ............. 367/24 |
| 2008/0080309 A1 | 4/2008 | Elkington et al. |
| 2008/0089174 A1 | 4/2008 | Sollner et al. |
| 2008/0144434 A1 | 6/2008 | Hegna et al. |
| 2008/0151688 A1 * | 6/2008 | Goujon ..................... 367/15 |
| 2008/0285380 A1 | 11/2008 | Rouquette |
| 2009/0010101 A1 | 1/2009 | Lunde et al. |
| 2009/0092006 A1 * | 4/2009 | Teigen et al. ................ 367/19 |
| 2009/0122641 A1 | 5/2009 | Hillesund et al. |
| 2009/0262601 A1 * | 10/2009 | Hillesund et al. ............ 367/16 |
| 2010/0103772 A1 | 4/2010 | Eick et al. |
| 2010/0195434 A1 | 8/2010 | Menger et al. |

OTHER PUBLICATIONS

Musser, et al., "Streamer Positioning and Spread Stabilization for 4D Seismic," SEG/New Orleans 2006 Annual Meeting 6-9 (2006).

PCT/US11/39640 PCT International Search Report (PCT/ISA 210) Dated Oct. 26, 2011.

* cited by examiner

Prior Art

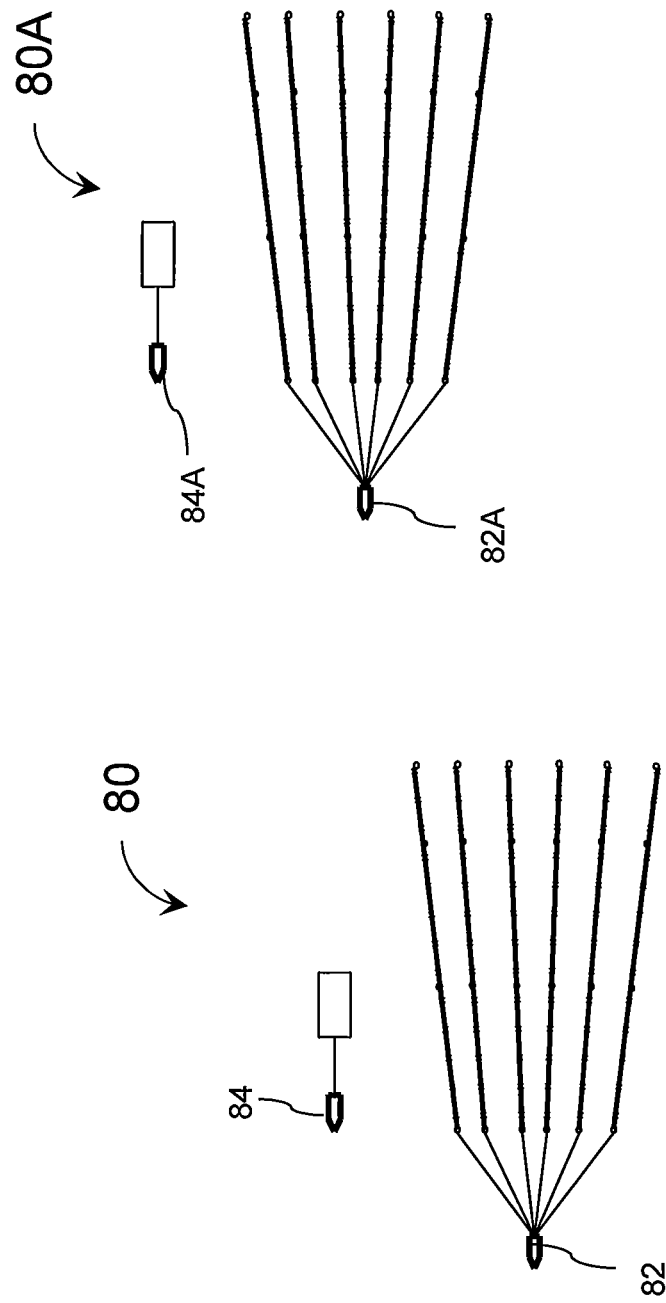

MARINE SEISMIC DATA ACQUISITION USING DESIGNED NON-UNIFORM STREAMER SPACING

CROSS-REFERENCE TO RELATED APPLICATIONS

This application is a non-provisional application which claims benefit under 35 USC §119(e) to U.S. Provisional Application Ser. No. 61/353,089 filed Jun. 9, 2010, entitled "Marine Seismic Data Acquisition Using Designed Non-Uniform Streamer Spacing," and to U.S. Provisional Application Ser. No. 61/353,095 filed Jun. 9, 2010, entitled "Seismic Data Acquisition Using Designed Non-Uniform Receiver Spacing" which are both incorporated herein in their entirety.

STATEMENT REGARDING FEDERALLY SPONSORED RESEARCH OR DEVELOPMENT

None.

FIELD OF THE INVENTION

This invention relates to seismic data acquisition of geologic structures in the earth in a marine environment and processing the data that is useful in interpreting the geologic structures.

BACKGROUND OF THE INVENTION

Marine seismic exploration is used to investigate and map the structures and character of subsurface geological formations underlying a body of water. Marine seismic data is typically gathered by towing seismic sources (e.g., air guns) and seismic receivers (e.g., hydrophones) through a body of water behind one or more marine vessels. As the seismic sources and receivers are towed through the water, the seismic sources generate acoustic pulses that travel through the water and into the earth, where they are reflected and/or refracted by interfaces between subsurface geological formations. The seismic receivers sense the resulting reflected and/or refracted energy, thereby acquiring seismic data that provides information about the geological formations underlying the body of water. Basically a towed seismic source emits a wavefield that propagates down through the earth and is reflected and/or refracted by interfaces between subsurface geological formations then propagates back to the surface where the receivers detect and discretely sample the wavefield.

Typically, an array of thousands of individual seismic receivers is used to gather marine seismic data. The seismic receivers are generally uniformly spaced and attached to streamer cables that are towed behind the marine vessel. It is known that the relative positions of the marine seismic receivers during seismic data acquisition can affect the quality and utility of the resulting seismic data. The current teaching is to construct the towing configuration for the streamers such that the ends of the streamers nearest the towing vessel, (commonly known as "near receivers" or "head of the streamers" or "leading end") are all laterally spaced at equal distance and normally the receivers are equally spaced down the streamers. Typically contracts require that the streamers be maintained equally spaced to within 2% of nominal at the head of the streamers or the towing configuration must be adjusted to get "in spec". In this configuration, uniform coverage of the surface and subsurface is achieved by at least the near receivers. It is known that the wavefield detected by the sensors is poorly sampled in the lateral direction (perpendicular to the streamers) in most configurations of this type because of the spacing size utilized to make the cost of the survey viable and to avoid tangles of the equipment behind the boat. Normally the spacing between streamers as compared to the station spacing down the streamer typically varies from between 4 and 32. This means that if our standard station spacing on the streamer is 12.5 meters and the spacing between lines is 100 meters, then the ratio between the two spacings is 8. Thus, if the spacing of the streamers at the head of the streamers is large the wavefield detected by the receivers is highly under sampled in the lateral direction. For clarity, "lateral" is meant to describe perpendicular to the length of the streamer.

However, unpredictable environmental forces such as currents, winds, and seas present in many marine environments can cause the relative positions of marine seismic receivers to vary greatly as they are towed through the water. Therefore, it is common for steering devices (commonly known as "birds") to be attached to the streamer cables so that the relative positions (both lateral and vertical) of the seismic receivers can be controlled as they are towed through the water. The lateral control of the streamer positions down the streamer provides for the opportunity to intentionally flare the streamers and in so doing impact the sampling of the propagated wavefield.

SUMMARY OF THE INVENTION

The invention more particularly relates to a method of acquiring seismic data in a marine environment where a system of at least four steerable streamers that are vertically and/or laterally spaced from one another, are towed through a body of water, wherein each of the steerable streamers has a leading end and a trailing end, wherein the leading end of each streamer is spaced from the leading ends of other streamers in the system and wherein each streamer comprises a series marine seismic receivers that may be uniformly or irregularly spaced down each streamer. While being towed through the body of water, tow cables are configured using paravanes, doors or similar hardware attached to the system of streamers so as to tow and steer the leading end of the each streamer and/or steering the system of seismic streamers into a designed, irregular spacing configuration where the spacing between leading ends of adjacent streamers is not equal and at least one spacing is greater than five percent larger than another lateral spacing within the system. While being towed in the configuration described, the method includes emitting seismic energy and recording reflected and/or refracted seismic data with the seismic receivers.

In particular aspects of the present invention, each streamer may be configured to have receivers spaced uniformly along the length thereof or alternatively be configured to have receivers spaced irregularly along the length thereof, but where the same irregular pattern is repeated on each streamer. In another alternative arrangement, the streamers my be configured where each streamer has receivers spaced irregularly along the length thereof, where the irregular pattern is not repeated on all of the streamers.

In another aspect of the present invention, the lateral spacing between two adjacent streamers within the system is at least ten percent larger, or at least fifteen percent larger, or at least twenty percent larger, or at least twenty-five percent larger, or at least fifty percent larger, or at least ninety percent larger than the lateral spacing between another pair of streamers in the system.

In another preferred arrangement, the method includes arranging the system of seismic streamers in a designed, irregular configuration where each streamer has a leading end and a trailing end and where the width of the system at the trailing ends of the streamers is at least five percent, or at least ten percent or at least fifteen percent, or at least twenty percent wider than the width of the system at the leading ends.

The system is towed through a survey area along a series of generally parallel paths wherein each path with the survey area has a path on either side thereof and the system is towed so that gaps between each adjacent path are avoided in both the leading ends and trailing ends.

BRIEF DESCRIPTION OF THE DRAWINGS

The invention, together with further advantages thereof, may best be understood by reference to the following description taken in conjunction with the accompanying drawings in which:

FIG. 8 is schematic top view of a tow vessel towing streamers with a second source vessel aligned with the tow vessel and also showing the tow vessel and source vessel making a second path through the survey area and the relationship of the second path to the first path.

DETAILED DESCRIPTION OF THE INVENTION

Turning now to the preferred arrangement for the present invention, reference is made to the drawings to enable a more clear understanding of the invention. However, it is to be understood that the inventive features and concept may be manifested in other arrangements and that the scope of the invention is not limited to the embodiments described or illustrated. The scope of the invention is intended only to be limited by the scope of the claims that follow.

Figure 1:
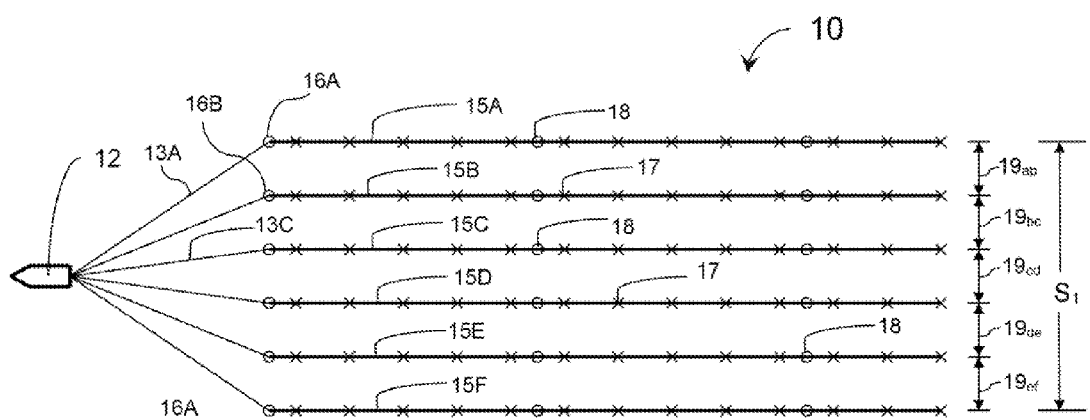
FIG. 1 is schematic top view of a tow vessel towing streamers in a conventional array for seismic acquisition.

An exemplary prior art marine seismic data acquisition system is indicated by the arrow 10 in FIG. 1. The marine seismic data acquisition system 10 comprises a tow vessel 12 towing a number of seismic streamers. A seismic source is typically towed with the seismic streamers, but for simplicity, the source is not shown. In the drawings, six streamers are shown, each labeled 15A, 15B, 15C, 15D, 15E and 15F. The streamers are arranged to be parallel to one another and be commonly and uniformly spaced apart. Each streamer includes a primary steering unit 16A, 16B, 16C, 16D, 16E and 16F, respectively which are each connected to the vessel 12 by a cable leader 13A, 13B, 13C, 13D, 13E and 13F. Along each streamer are a number of generally evenly spaced hydrophones 17 and additional steering devices 18. As deployed for seismic data collection, the total system width of the system 10 is $S_1$. The width-wise or lateral streamer spacing between each adjacent pair of streamers is one fifth of $S_1$ and indicated as $19_{ab}$, $19_{bc}$, $19_{cd}$, $19_{de}$ and $19_{ef}$. The streamer spacing is maintained constant by the primary steering units 15A through 15F along with the steering devices 18. In FIG. 1, the streamer spacing is such that:

$19_{ab}=19_{bc}=19_{cd}=19_{de}=19_{ef}$.

Most standard marine seismic acquisitions contracts would require that the spacing between the streamers would be maintained to less then 2% variability between streamers spacing in the real world. If the 2% limit of the difference between the nominal spacing of the streamer is exceeded, the acquisition would have to stop and the towing configuration of the ropes, doors and paravanes be adjusted until the spread is back in spec and then acquisition can continue. Such adjustments may require considerable time as it often requires pulling in several streamers to adjust the ropes and the stretchers, even if only to make very minor adjustments. Thus, it is not uncommon for such adjustments to take several days to get the configuration in spec and several days at day rates in the hundreds of thousands of dollars per day can be quite expensive.

In accordance with the present invention, it has been found that even or equal streamer spacing may not be most optimal for acquiring seismic data. Noise in the data set may be most readily identified by even spacing and therefore fairly easily filtered or cancelled in post acquisition processing within the limits of the sampling across the streamers. But highly non-uniform or irregular spacing may actually provide better results because the wavefield is now sampled with more granularity or density in the lateral or cross-line direction or perpendicular to the streamer length, so higher spatial frequency data is accurately captured. Additionally it has been found that the wavefield sensed in the lateral dimension (perpendicular to the streamers) by the receivers can be better reconstructed if the receivers are spaced in a highly non-uniform or irregular spacing. The existing lateral control systems of conventional streamer arrays provides an opportunity pursuant to the present invention to intentionally alter the lateral spacing of the streamers and in so doing impact the sampling of the propagated wavefield.

Essentially, geophysicists are able to process and interpret seismic data to map the various interfaces between formations based on individual data points established by the time delay of the signal returned from the formation. The data actually forms a large plurality of interface points. The points may be seen to form a nearly continuous line along each of the interfaces in the direction of the vessel travel. Closely spaced "lines" provides higher three dimensional definition, but at considerably higher cost. Simply put, a tow vessel only has so much capacity for towing streamers and close lateral spacing of streamers reduces the total width or length of the streamer array. Reduced width means more time at sea to survey an area and reduced length compromises data quality for higher angle long offset echo returns. While it would be preferred to properly sample the wavefield containing the echo returns with close spacing of lines and receivers, the costs associated with such a proper survey are simply cost prohibitive.

Currently, geoscientists interpolate the shape of the geological interfaces in the gaps between points by using the data received by seismic receivers that are close to the gaps in question. Most interpolation algorithms are simple mathematical processes, such as basic averaging of the nearby data. With the missing information supplied by the interpolation, the data is provided to seismic processors to create an image of the geological subsurface. However, according to the present invention, it is better to reconstruct the entire wavefield in one realization. Wavefield reconstruction involves statistical linear regression analysis where a model wavefield is created from prior knowledge of the geological subsurface and is iteratively refined based on actual measured data from the seismic survey. Through the regression analysis, the L0 and L1 norms are calculated for each comparison between the model wavefield and the actual data such that the model wavefield is iteratively corrected until calculated L0 and L1 norms are minimized. At L0 and L1 norm minimization, the model wavefield is believed to most accurately represent the actual wavefield that would have ascended from the geological subsurface if data could have been recorded at every possible location. Thus, at this point, the model wavefield or reconstructed wavefield may provide data from the entire surveyed area including all gaps between points and from any point or points within the survey area. Data from the reconstructed wavefield is then processed in the conventional manner to create a three dimensional image of the subsurface structures. With an accurately reconstructed wavefield, the shape of the geological interfaces can be more properly imaged. It should be recognized that wavefield reconstruction utilizes data from receivers well distant from gaps as the iterative process attempts to "fit" the model wavefield to the larger data set. Wavefield reconstruction algorithms model the wavefield based upon its components and the physical properties of the survey area being sampled. In the present invention, prior knowledge of the geological substructures in the design of the receiver array and especially the non-uniform spacing of the receiver array enhances and enlarges the strength of such algorithms to obtain a more accurate reconstructed wavefield with same number or fewer data points. Wavefield reconstruction also takes advantage of the truism that the simplest model of the earth that accurately fits the measured data is likely the most correct model. Thus, by minimizing the L0 and L1 norms, the complexity of the geologic model that accurately matches the measured data is also minimized and provides a very useful reconstructed wavefield for imaging.

The wavefield reconstruction fidelity is dependent on the receiver spacings used in the sampling of the wavefield. It has been found that the wavefield sensed in the lateral dimension (perpendicular to the streamers) by the receivers can be better reconstructed if the receivers are spaced in a highly non-uniform or irregular spacing. The estimation can typically be quite accurate depending on the complexity of the geological interface. A flat interface is quite easy.

Consider the situation where someone desires to determine the contour of the bottom of a back yard pond where the water is dark and the person does not want to get wet. One technique would be to measure the water depth on linear profiles sampling every inch with a yard stick and taking profiles about 8 inches apart. This would generate a very large accurately sampled data set very similar to our conventional 3D seismic surveys. But since we know before hand that a pool normally has a generally flat or rounded bottom with some small variation in depth from one end to the other and that the deepest points will be away from the edges and somewhere centered within the pool, we can use this knowledge to take some short cuts. Using this knowledge, we can determine that a solution would be to take the same yard stick and dip it into the pond at various places in the pond and develop a rough, but fairly accurate model of the bottom of the pond. This use of prior knowledge of the general type and nature of the pool allows us to model the problem and determine a method that would sample less densely and just a few profiles allow us to determine a very accurate representation of the pool bottom. This use of prior knowledge of the general type and nature of the pool allows us to sample less densely and just a few profiles allow us to determine a very accurate representation of the pool bottom. In fact, applying principles of the present invention and consider what we know about pools in general, we could accurately model what sort of sampling it would take to very accurately reconstruct the pool depths. This prior knowledge and a bit of modeling let us dramatically reduce the number of samples required and the effort taken to determine the water depth.

Next, let us consider what would happen if the pool is now a murky fishing pond. Now we can not make the assumption that the pool bottom is flat or smooth in fact more then likely the bottom is quite rough with rocks logs and other trash. If we look around the area on the surface we might conclude the bottom could have logs, brush or rocks. In this case, if the bottom is a very rough surface or unpredictable surface, the contour of the bottom is much more complicated and challenging to survey with few samples. Now a more densely sampled survey with more sampling profiles would be needed to accurately measure the subsurface. This kind of complication routinely occurs in seismic surveys.

The present invention uses some relatively simple logic to provide quality subsurface maps, models or images of geological interfaces, but creates such maps, models or images from data that can be acquired in a more efficient manner than current techniques using interpolation techniques that are currently available. Returning to the backyard fishing pond example, the present invention would be practiced in a very small scale but analogous example where the surveyor would take prior knowledge or data and make several depth measurements fairly close together to determine how smooth or continuous the bottom is. If the surveyor were to analyze the results of the depth measurements along his prior knowledge of the fishing pond and conclude that the bottom is smooth or flat without rocks, logs or debris, then the remainder of the measurements may be few and spread out. The depth between actual measurements may be confidently interpolated. For example, the depth at a point half way between two actual measurements two feet apart that are 16 inches and 18 inches may be confidently interpolated to be 17 inches. One need NOT make the actual measurement, especially if the time or cost to make such measurement is substantial. On the other hand, an efficient survey design could be developed that would provide a reasonably accurate model of a more complicated bottom structure, but the measurements would be closer together. The critical difference is between the concepts of interpolation and wavefield reconstruction. Interpolation is a mathematical process that does not use prior knowledge of what is being sampled to calculate the new value. In our example, most algorithms will come up with 17 inches due to the lack of knowledge of what is being sampled. This works with a pool bottom that is smoothly varying but if we consider a rough bottom of brush, rocks and logs, then we cannot confidently interpolate the answer. In this case we must reconstruct the bottom through using prior knowledge of the likeliness of the roughness on the bottom and proper sampling of the data we do sample. We do this currently by various mathematical techniques that attempt to minimize the L0 and L1 norms which minimize the overall entropy of the system. As we pointed out earlier on this technique, the fundamental assumption is that the simplest model that can be derived from the measured data is likely the most geologically accurate. This is an area of active research for optimal techniques to utilize a priori knowledge of the subsurface geologic structures to determine how sparse of a survey we can acquire and still reconstruct the wavefield and obviously techniques will improve that allow us to reconstruct the wavefield more accurately with continued effort. The power of the present invention will be enhanced by further developments in wavefield reconstruction technology.

Back to a seismic survey, applying the aforementioned concept becomes much more complicated for marine seismic data acquisition in that portions of the survey area may be simpler geological structures and other portions may have more complicated structures. Typically, a marine seismic data survey will survey a subsea area where some data has already been collected, but the data is not sufficiently rich to resolve potential hydrocarbon deposits for drilling. Such surveys are called "spec surveys" or "speculative surveys" or they may just be older and acquired with limited equipment. Data from the spec survey represents the a priori knowledge that may provide enough information to determine the complexity of the geological structures and be used to create a model of the substructures sufficient to analyze the "spacing" of actual data necessary to get a sufficiently accurate image of the geological substructures that are sufficient to justify the risk for spending many millions of dollars on exploration wells. So, this invention is about getting sufficient volumes or density of seismic data to decide and plan a drilling program while minimizing the cost of gathering the seismic data.

Figure 2:
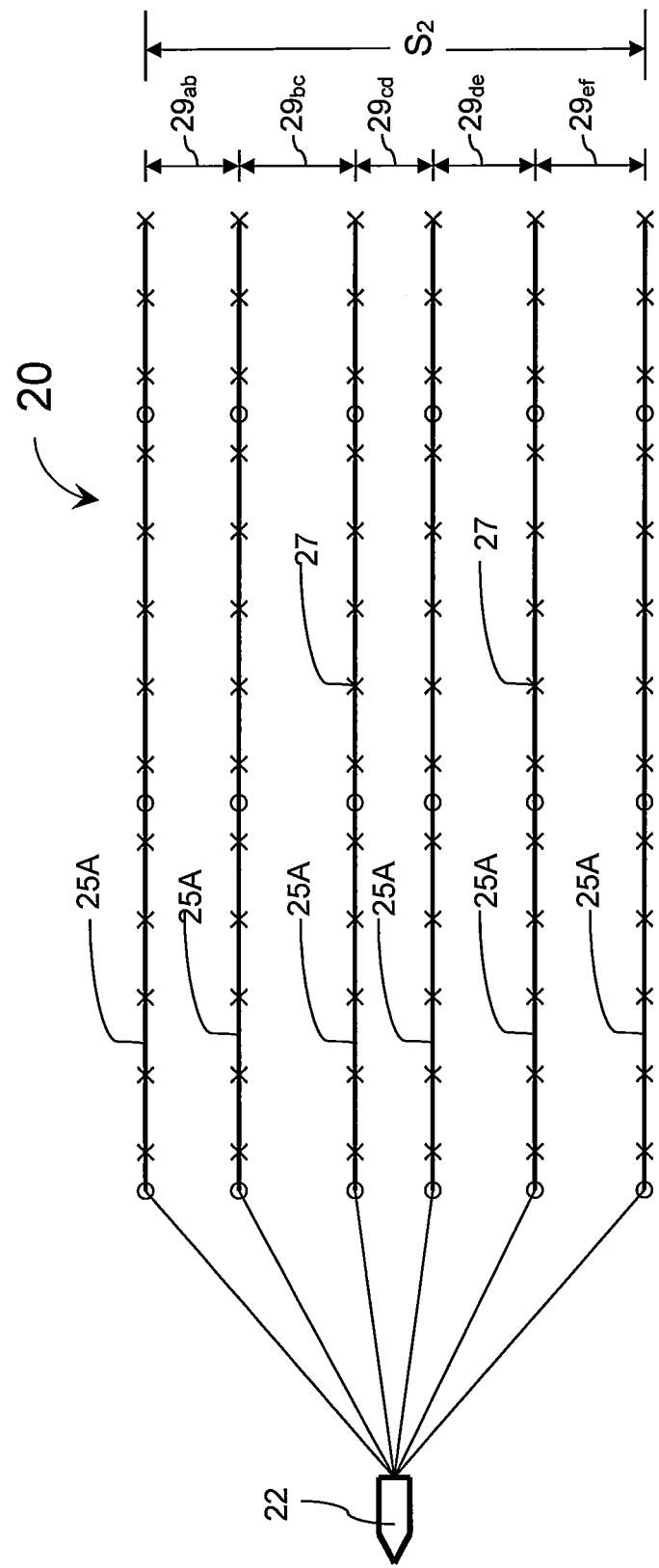
FIG. 2 is schematic top view of a tow vessel towing streamers in a first inventive array for seismic acquisition.

Referring now to FIG. 2, a seismic data acquisition system is indicated by the arrow 20 where tow vessel 22 is towing six streamers comparable to the six streamers of FIG. 1. However, the streamers 25A, 25B, 25C, 25D, 25E and 25F are arranged to be spaced from one another and by an uncommon or irregular spacing. The primary steering units 26A, 26B, 26C, 26D, 26E and 26F, respectively, which are each connected to the vessel 22 by a cable leaders 23A, 23B, 23C, 23D, 23E and 23F, are actuated to steer the streamers into a planned, but irregular, configuration. Along each streamer are a number of generally evenly spaced hydrophones 27 and additional steering devices 28. As deployed for seismic data collection in FIG. 2, the total system width $S_2$, is wider than $S_1$. As with system 10 in FIG. 1, each pair of streamers have an individual streamer spacing indicated as $29_{ab}$, $29_{bc}$, $29_{cd}$, $29_{de}$ and $29_{ef}$. While one or more streamer spacings may be the same as other streamer spacings, not all are the same. Preferably, at least one streamer spacing 29 is equal to or less that the streamer spacing 19 of the system 10 shown in FIG. 1. Specifically, spacing $29cd$ is the same as spacing $19cd$ while spacing $19ab$ is slightly larger than spacing $19ab$ and spacing $29bc$ is quite a bit larger than spacing $19bc$. With current wavefield reconstruction techniques, at least one streamer spacing must be less than or equal to or very close to equal to the streamer spacing 19 of the FIG. 1 System 10 in order to provide the accuracy of the data collected by inventive system 20.

As further advances in wavefield reconstruction technology are developed, it is anticipated that comparable resolution of images will eventually be derived from data collected from common spaced conventional system and from data collected from an acquisition system where streamer spacing is based on a designed non-uniform spacing with all individual streamer spacings being greater than the common streamer spacing system. In other words, a properly designed, non-uniform streamer spacing may provide considerably greater one pass coverage over a survey area and, at the same time, provide as high or higher resolution images after processing with advances in wavefield reconstruction technology. Since $S_2$ is wider than $S_1$, the area to be surveyed will be surveyed in less time with an inventive system 20 configuration as compared to a conventional system 10 configuration as each pass through the survey area will cover a larger portion of the survey area. The range at which a configuration may be made wider without losing comparable accuracy depends on the complexity of the subsurface structures in the area to be surveyed. Based upon current studies, comparable accuracy may be obtained with $S_2$ being 10 to 20 percent wider and current estimates are that 35% wider provides data that is accurately processable. The same current analysis indicates that above 35% may create unacceptable holes in the data in certain complex substructures, but upwards of 50% and as high as 80% is possible and likely in fairly simple geologic structures and in benign seas and with a larger number of streamers.

Figure 3:
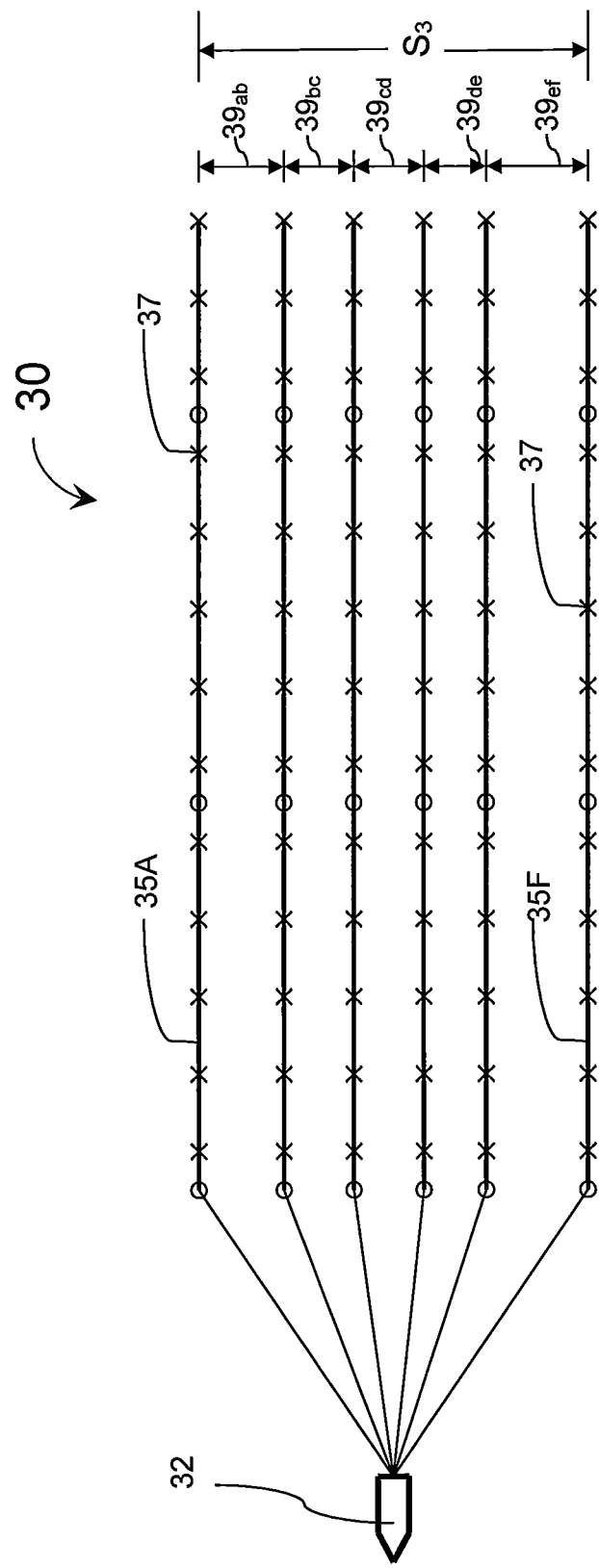
FIG. 3 is schematic top view of a tow vessel towing streamers in a second inventive array for seismic acquisition.

Turning now to FIG. 3, the inventive technique of the present invention may be used to another and perhaps opposite end. The first end was to create an accurate model of the geological substructures with a sparser array of streamers. The opposite end is to provide a much more precise model of the geological substructures without giving up productivity. In FIG. 3, a system 30 is shown where tow vessel 32 is towing six streamers comparable to the six streamers of FIG. 1 and of FIG. 2. Like system 20, the streamers 35A, 35B, 35C, 35D, 35E and 35F are arranged to be spaced from one another and by an uncommon or irregular spacing by primary steering units 26A, 26B, 26C, 26D, 26E and 26F, respectively, the lateral width $S_3$ of system 30 is approximately the same as $S_1$, the width of conventional system 10. Like in the other systems, the streamers 26 are each connected to the vessel 22 by cable leaders 23A, 23B, 23C, 23D, 23E and 23F are activated to steer the streamers into the planned, irregular configuration. Along each streamer are a number of generally evenly spaced hydrophones 37 and additional steering devices 38.

Like in the FIG. 1 example, each pair of streamers has an individual streamer spacing indicated as $39_{ab}$, $39_{bc}$, $39_{cd}$, $39_{de}$ and $39_{ef}$. While one or more streamer spacings may be the same as other streamer spacings, not all are the same. Preferably, at least one streamer spacing 39 is less that the streamer spacing 19 of system 10 shown in FIG. 1 while one or more streamer spacings 39 are larger than the common streamer spacing 19. However, since $S_3$ is essentially the same as $S_1$, the area to be surveyed will take about the same amount of time with the inventive system 30 configuration as compared to the conventional system 10 configuration. What is key to understanding the invention is that by having one or two or three streamer spacings 39 being less than the common streamer spacing 19 provides greater wavefield reconstruction accuracy and higher spatial sampling accuracy. The closely spaced streamer spacing $39bc$ and $39de$ provide accurate data and provides details for the wavefield reconstruction processors to more accurately estimate the shape of the geological interfaces in the larger gaps represented by spacings $39_{ab}$ and $39_{ef}$. System 30 essentially provides greater geologic detail without higher acquisition cost.

Figure 4:
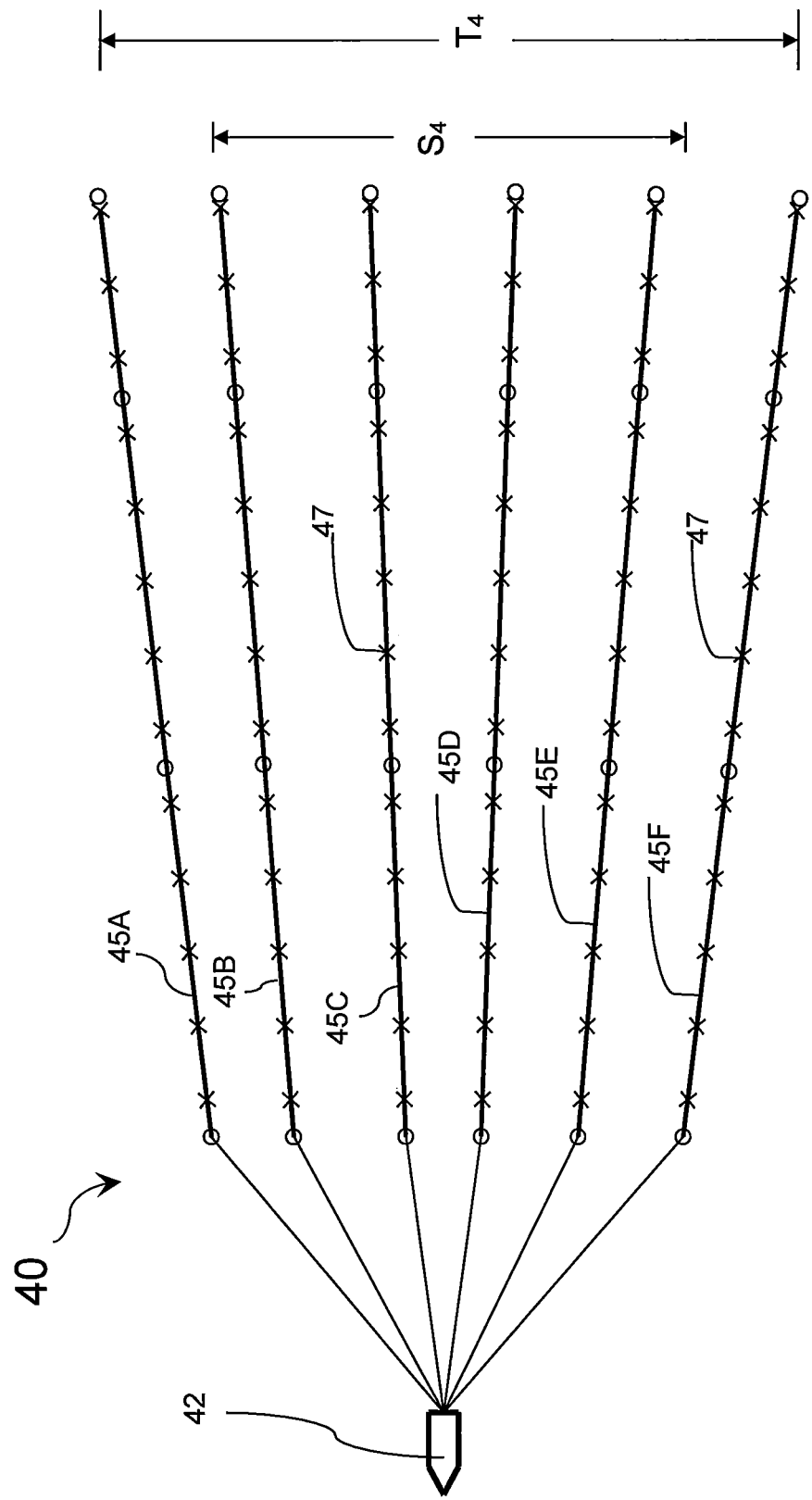
FIG. 4 is schematic top view of a tow vessel towing streamers in a third inventive array for seismic acquisition.
Figure 5:
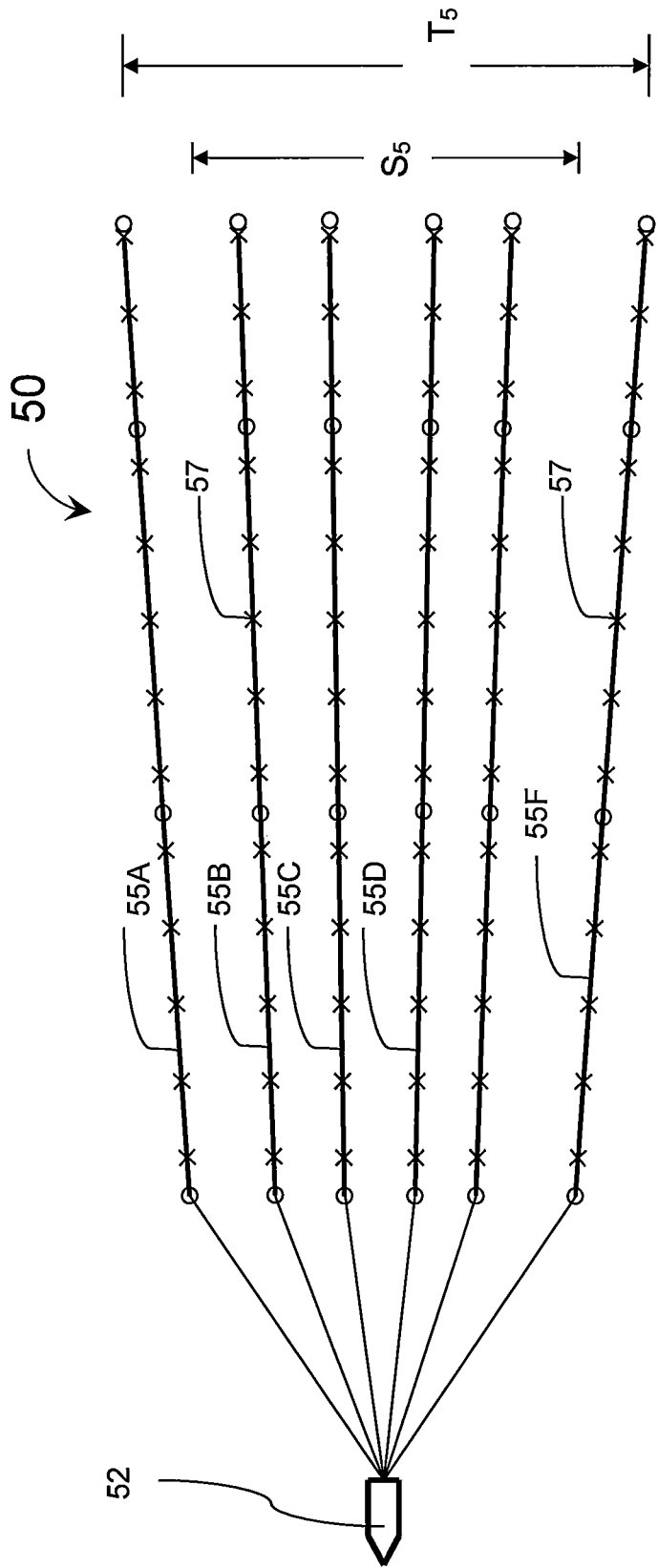
FIG. 5 is schematic top view of a tow vessel towing streamers in a fourth inventive array for seismic acquisition.

In other more preferred embodiments, the streamers do not have to be parallel to one another and are preferably NOT parallel to one another. As shown in FIGS. 4 and 5, the streamers are configured to flare such that the leading ends of the streamers are closer together than the trailing ends of the streamers. This flared configuration provides better coverage and helps avoid gaps in the data where one pass of the tow vessel is adjacent a previous or subsequent pass of the tow vessel, especially when cross currents or other irregularities in the winds and seas arise. The tow vessel may be towed to make sure that the leading ends of the streamers pass over an area of the survey adjacent to a previous pass such that no gap is created in the data. A gap is where the outside data set of one pass is spaced from the outside data set of the next pass at a spacing within the wavefield reconstruction algorithms ability. Gaps are common problems in marine seismic data recordings due to tides, currents and winds and a lot of time, effort and expense is put into towing the array of streamers along a path to avoid unacceptable gaps between passes.

Gaps are also a problem at the tail end of the streamers. So, the operators of the tow vessel must steer the boat and the streamer array so that both the leading ends and trailing ends of the streamers are within an acceptable spacing from the previous pass. Sometimes this may require towing the leading ends over areas that have already been surveyed to avoid a gap in the trailing ends or tow the trailing ends over areas that have been surveyed to avoid gaps in the leading ends. This burying of the nears or the fars is quite expensive and very unproductive. Considering that streamers are typically 1 to 2 kilometers in length minimum and can extend to lengths of ten kilometers or more, the ability to get new data with both the leading and trailing ends is unlikely in a cross current without a high risk of having a gap. With the flaring of the trailing ends, it should be easier for the operator of the tow vessel to get new data on each pass at both the leading ends and trailing ends.

The sparser coverage at the trailing ends has been found to be acceptable because the distance from the tow vessel and therefore the seismic source makes the collection of high frequency data at the trailing ends unlikely due to Q attenuation. Lower frequency data may be accurately acquired with sparser data spacing while closer spacing at the leading ends is desirable where the high frequency data may be recording and closer spacing is important to wavefield reconstructing the more accurate high frequency data.

In FIG. 4, the spacing 49 at the leading ends is intended to be the same as the spacing 29 in FIG. 2 such that the leading end system width S4 of system 40 is the same as the width $S_2$. The trailing end system width T4 is at least five percent larger than $S_4$ and preferably between 10 and 35% larger than S4. Similarly, in FIG. 5, the spacing 59 is intended to be the same as the spacing 39 in FIG. 3 where highly detailed images are desired, where the leading end system width $S_5$ of system 50 is the same as the width S3. The trailing end system width T5 is at least five percent larger than $S_5$ and preferably between 10 and 35% larger than S5.

Figure 6:
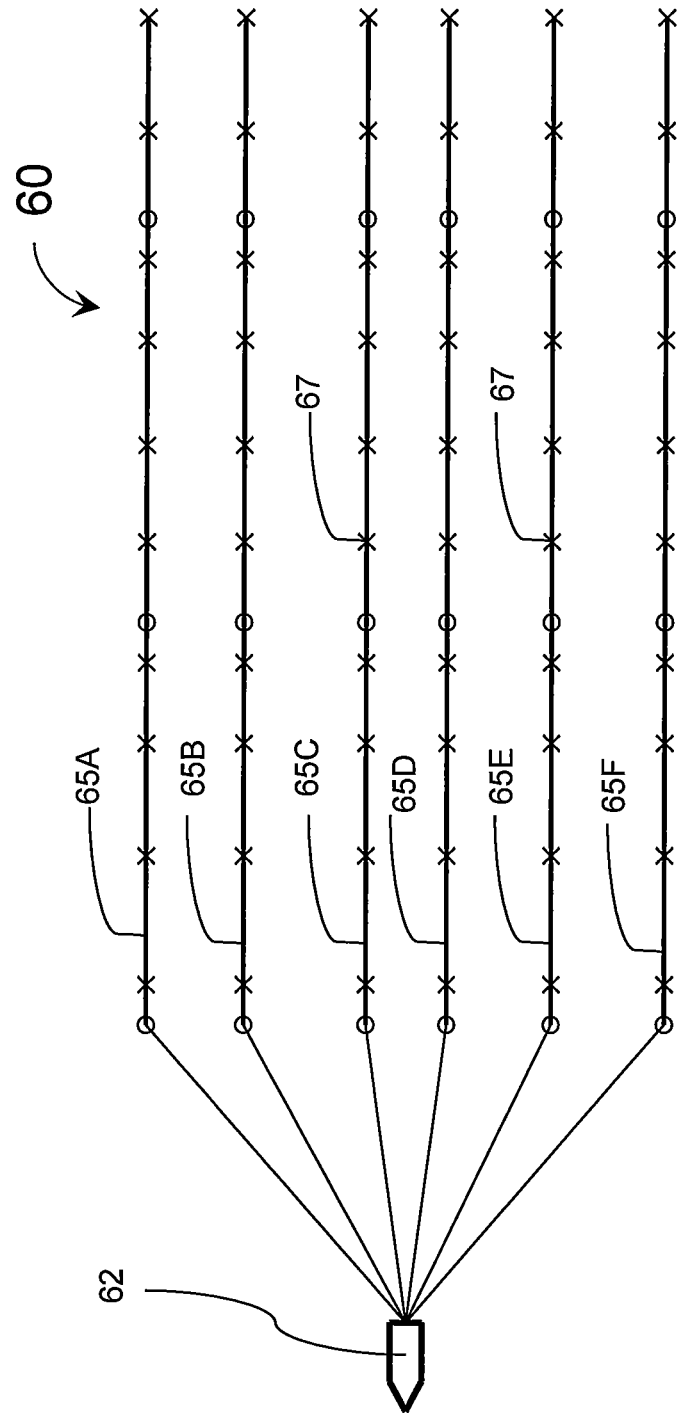
FIG. 6 is schematic top view of a tow vessel towing streamers in a fourth inventive array for seismic acquisition.
Figure 7:
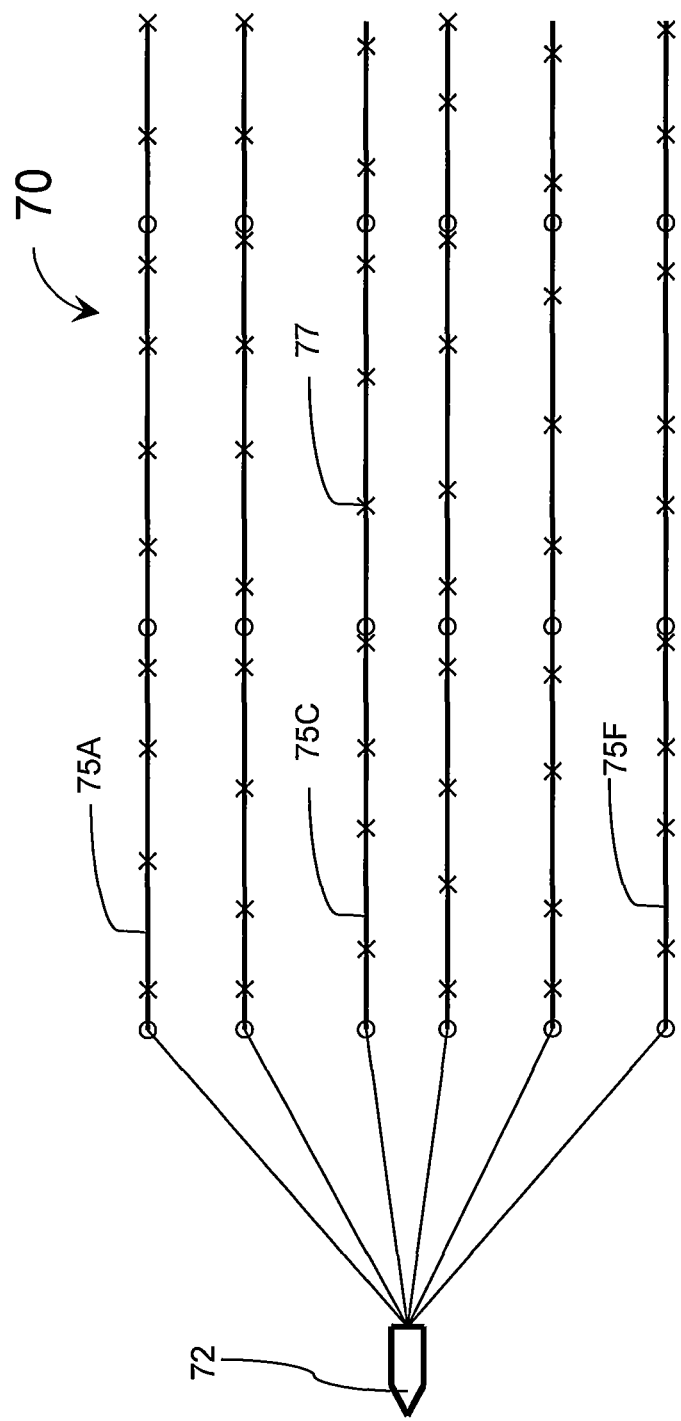
FIG. 7 is schematic top view of a tow vessel towing streamers in a fourth inventive array for seismic acquisition.

While the systems 20, 30, 40 and 50 have been described as having irregular spacing, the spacing of the hydrophones along the lengths of the streamers has been described as uniform, the same as a conventional streamer. The quality of the wavefield reconstruction is dependent on the receiver sampling in a two dimensional sense, width-wise across the streamer array (laterally) and length-wise along the streamer array. It is possible to have irregular spacing of the receivers along the length of the streamers. This is shown in FIG. 6 where System 60 includes streamers having irregular spacing along the lengths of the streamers but where the irregular spacing is common from streamer to streamer. In other words the spacing is the same for each streamer, but the spacing along each streamer is irregular. In FIG. 7, System 70 includes irregular spacing on each streamer that is NOT common from streamer to streamer. The streamers are not all the same. With the hydrophones or seismic receivers being irregular spacing in both the lateral and lengthwise directions must be designed and not random. The ability to adequately reconstruct the wavefield will then depend on the design of the receiver spacings in both dimensions. Care must be taken in designing such a configuration so that the wavefield does not become under sampled for the subsurface objective being imaged. This can be determined through modeling of the a priori data available and the geologic model of the subsurface that is being imaged.

It should be understood that the entire streamer system need not be flared. Having less than the whole length of the system flared whether only ten percent, 25% or 50%, 60%, 75% or 80% or 90% of the length flared would still be within the scope of the present invention.

It should also be understood that the flaring is intended for active seismic data acquisition. A tow vessel spends a significant amount of time outside of the survey area after a pass through the survey area where it has run out straight and turns and gets all of the streamers aligned behind the tow vessel for another pass. As such, the marine seismic data acquisition method according to embodiments of the present invention intentionally controls the position of the seismic streamers in a desired configuration while seismic data and the streamers may not be flared or irregularly spaced at other times. While deploying the streamers, a highly flared configuration may be employed and once fully deployed and stable, the primary steering units along with secondary steering units are used to arrange the system in its planned configuration with irregular spacing and desired flaring. The length of the lead cable leaders are also adjusted to so that the leading ends of the streamers are approximately the same distance behind the tow vessel. It should be noted that once a towing configuration using cables back to the seismic vessel is implemented it will most likely remain in such a nominal state during periods of acquisition and during periods of non-acquisition.

Acquisition of seismic data may include sources towed behind the tow vessel 82 and may also include sources on source vessels such as source vessel 84 as shown in FIG. 8 towing a source array of marine seismic sources such as airguns, that operates in conjunction with the tow vessel 82. The tow vessel 82 and streamer system are generally identified as a seismic acquisition system 80. In a particular aspect of FIG. 8, the tow vessel 82 follows a path through a survey area in a manner to acquire data from the earth below the seafloor. Each pass through the survey area must be along a path where gaps are created at either the near recorders or the far recorders. Thus, the system of streamers and recorders must be towed so that leading ends and trailing ends of the streamers must follow paths that are adjacent to other paths and without gaps and preferably not overlapping so much that time is wasted re-surveying what has already been surveyed. In the second system 80A, the second tow vessel 82A is actually the same tow vessel in system 80 where it is following the next path through the survey area gathering data along a path that does not leave a gap. The overlap in the trailing ends is acceptable in the flared configuration as cross currents and other challenges make it difficult to have the entire system follow a course exactly adjacent to the previous path. It is easier for the tow vessel operator to steer a course that pulls the leading ends along the desired path and have the flared trailing ends provide wide coverage to avoid gaps and efficiently acquire data.

In certain embodiments of the present invention, the seismic streamer system is continuously maintained in a desired configuration over a controlled distance of at least one kilometer, at least five kilometers, or at least 15 kilometers. In certain embodiments of the present invention, the seismic streamer system is continuously maintained in the desired configuration for a controlled time of at least five minutes, at least 20 minutes, at least 60 minutes, or at least 120 minutes. During the controlled time and/or over the controlled distance, the seismic streamer system is used to gather marine seismic data. Moreover, while it may have been assumed that the preferred embodiments were arranged to tow the streamers at similar running depths, such a limitation is not part of the present invention. Actually, part of the non-uniform spacing may be accomplished by towing streamers at different depths. Wavefield reconstruction from data collected by streamers at non-uniform depths may add additional opportunities for more accurate imaging of geological substructures.

In certain embodiments of the present invention, the seismic streamer system is independent of the sources which can be towed behind other vessels. There is no limitation to say that this invention could not be used with multi-vessel operation or even that different vessels may be towing streamers sets that are in different configurations. Each of these embodiments could be modeled based upon the a priori data and the model being imaged and the wavefield reconstruction could be tested with different algorithms prior to actual real field acquisition.

Finally, the scope of protection for this invention is not limited by the description set out above, but is only limited by the claims which follow. That scope of the invention is intended to include all equivalents of the subject matter of the claims. Each and every claim is incorporated into the specification as an embodiment of the present invention. Thus, the claims are part of the description and are a further description and are in addition to the preferred embodiments of the present invention. The discussion of any reference is not an admission that it is prior art to the present invention, especially any reference that may have a publication date after the priority date of this application.

The invention claimed is:

1. A method of acquiring seismic data in a marine environment comprising the steps of:
   a. towing a system of at least four steerable streamers that are vertically and/or laterally spaced from one another, through a body of water, wherein each of the steerable streamers has a leading end and a trailing end, wherein the leading end of each streamer is spaced from the leading ends of other streamers in the system and wherein each streamer comprises a series marine seismic receivers that may be uniformly or irregularly spaced down each streamer;
   b. simultaneously with step (a), configuring by use of tow cables, paravanes, doors or similar hardware attached to the system of streamers so as to tow and steer the leading end of the each streamer and/or steering the system of seismic streamers into a designed, irregular spacing configuration where the spacing between leading ends of adjacent streamers is not equal and at least one spacing is greater than five percent larger than another lateral spacing within the system and wherein the width of the system at the trailing ends of the streamers is at least five percent wider than the width of the system at the leading ends; and
   c. simultaneously with steps (a) and (b), emitting seismic energy and recording reflected and/or refracted seismic data with the seismic receivers.

2. The method according to claim 1, wherein the width of the system at the trailing ends of the streamers is at least ten percent wider than the width of the system at the leading ends.

3. The method according to claim 1, wherein the width of the system at the trailing ends of the streamers is at least fifteen percent wider than the width of the system at the leading ends.

4. The method according to claim 1, wherein the width of the system at the trailing ends of the streamers is at least twenty percent wider than the width of the system at the leading ends.

5. The method according to claim 1 wherein the system is towed through a survey area along a series of generally parallel paths wherein each path with the survey area has a path on either side thereof and the system is towed so that gaps between each adjacent path are avoided in both the leading ends and trailing ends.

* * * * *